United States Patent [19]
Knoop et al.

[11] 3,898,875
[45] Aug. 12, 1975

[54] METHOD AND APPARATUS FOR TESTING ELECTRIC MOTORS

[75] Inventors: Donald E. Knoop, Benton Harbor; Marc C. Loessel, St. Joseph; Arne M. Nystuen, Stevensville, all of Mich.

[73] Assignee: Whirpool Corporation, Benton Harbor, Mich.

[22] Filed: Oct. 9, 1973

[21] Appl. No.: 404,259

[52] U.S. Cl. .................................... 73/116; 73/134
[51] Int. Cl.² .................................. G01L 3/22
[58] Field of Search.......... 73/116, 133 R, 134, 137, 73/138; 324/158 MG

[56] References Cited
UNITED STATES PATENTS

| | | | |
|---|---|---|---|
| 1,572,940 | 2/1926 | Legg | 73/136 A |
| 2,622,235 | 12/1952 | Petit | 73/116 UX |
| 3,052,117 | 9/1962 | Miller et al. | 324/158 MG UX |
| 3,289,471 | 12/1966 | Maxwell | 73/134 X |
| 3,402,600 | 9/1968 | Athey | 73/133 R |
| 3,789,659 | 2/1974 | Haldeman | 73/134 |

*Primary Examiner*—Charles A. Ruehl
*Attorney, Agent, or Firm*—Wegner, Stellman, McCord, Wiles & Wood

[57] ABSTRACT

An electric motor being tested is rigidly mounted in a stationary platform, and is fixedly coupled through a torque and speed transducer to a load electric motor. Initially, the load motor is energized to drive the unergized test motor up to a running speed. Electric power is then switched from the load motor to the test motor. The field winding of the load motor, which now acts as a generator, is coupled to a linear circuit which passes controlled direct current to variably load the electric motor in order to produce linear deceleration followed by linear acceleration over a short testing interval. Transducers generate analog signals which are converted to digital form and are stored in a memory. Subsequently, the stored signals are read over a time period substantially longer than the testing interval.

10 Claims, 3 Drawing Figures

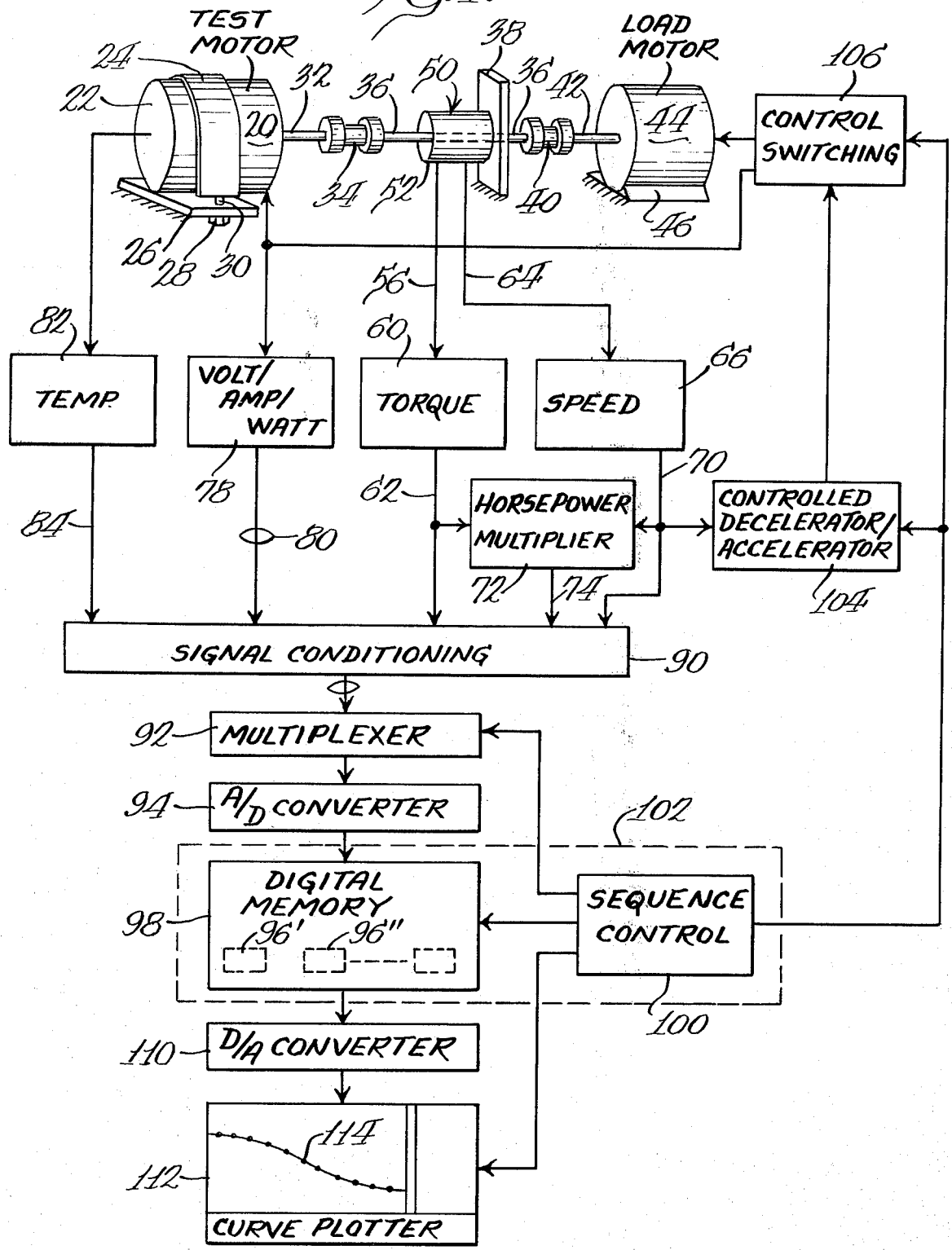

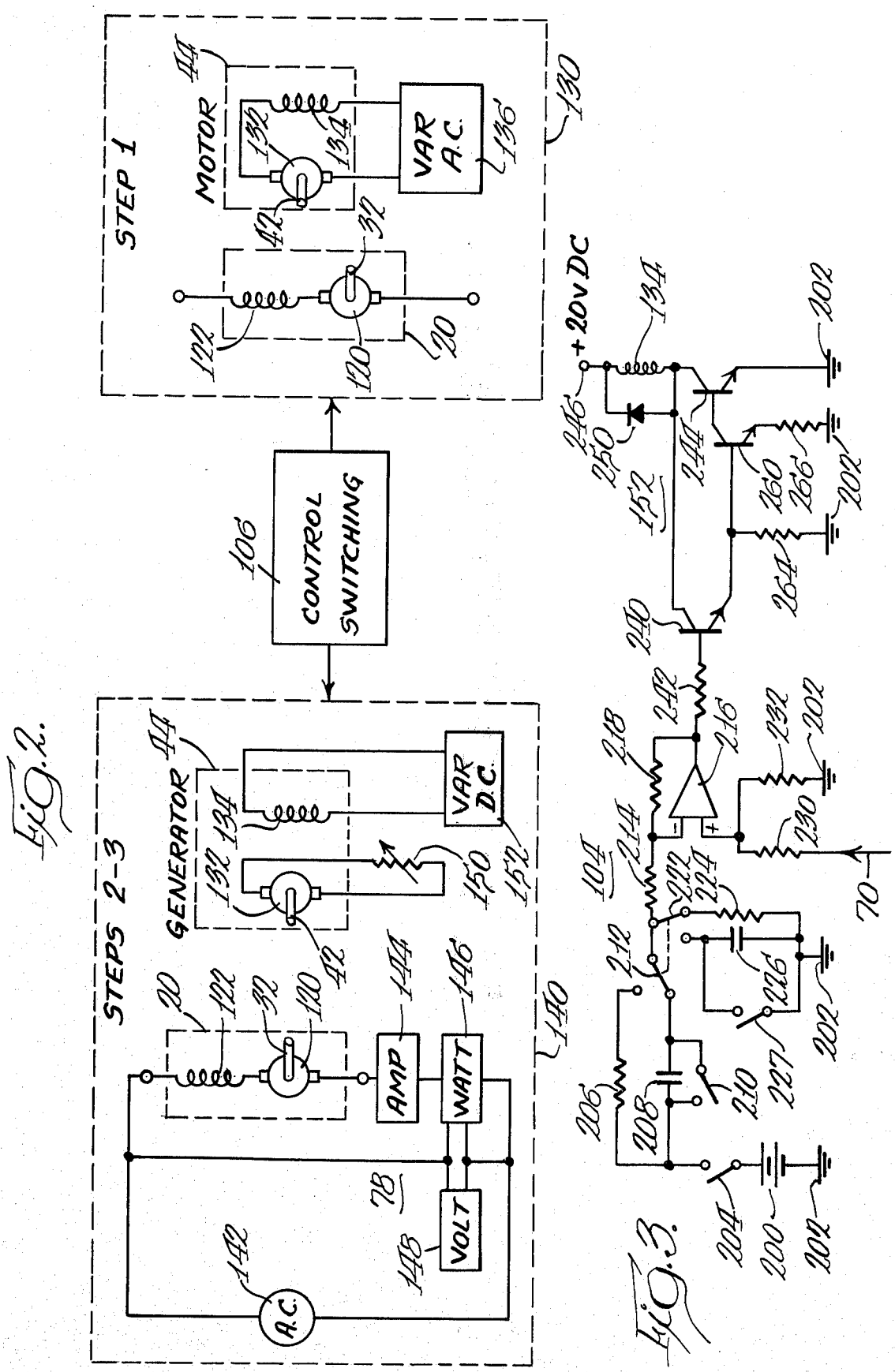

3,898,875

METHOD AND APPARATUS FOR TESTING ELECTRIC MOTORS

BACKGROUND OF THE INVENTION

This invention relates to a method and apparatus for rapidly testing the dynamic characteristics of an electric motor over a short time interval which prevents any substantial heating of the electric motor.

Traditional methods of dynamically testing an electric motor have included the string and pulley method, and the reaction table method such as used in a dynamometer. Since the performance characteristics of an electric motor change with temperature, the testing desirably should be conducted very quickly (such as over several seconds) so that the motor will not heat up appreciably during the test. Unfortunately, traditional testing methods are not adapted for such rapid testing of performance characteristics.

Various test methods and apparatus have been developed to provide quicker testing of small induction motors. For example, an automated go, no-go system for a cradle mounted induction motor has used a plurality of comparators for determining at predetermined points along a performance curve whether the energized test motor has exceeded certain reference parameters. The outputs of the comparators are coupled to corresponding flip-flops for storing a go, no-go indication of whether the preselected performance points were exceeded or not. An example of such an automated testing apparatus is shown in U.S. Pat. No. 3,402,600 to Athey. While such tests can be run over a short interval, very limited data is gathered as to the performance of the test motor. Also, certain types of electric motors heat very quickly, and hence the test results are accurate (for a cool motor) only at low speeds.

It has been known to mount an electrical motor being tested to the cradle of a dynamometer, and then run the motor shaft up to speed by use of a load motor which is initially energized while the test motor is de-energized. Electric power is then switched to energize the test motor, while the load motor is run as a loading generator. The deflection of a movable table, forming the dynamometer, provides a continuous measure of the torque produced by the test motor during running conditions. Unfortunately, the movable platform forming the dynamometer becomes unstable at high speeds, and violently shakes the test motor as it approaches running speeds, preventing dynamic testing of torque at full operating speed.

Another problem with prior automated test systems for rapidly determining motor performance has been that the measured torque does not represent the actual torque delivered to a load at steady state, but undesirably includes other factors such as armature inertia. To determine true motor torque deliverd to a load at steady state, it has been necessary to manually accelerate and manually decelerate a motor to determine torque measurements which are then averaged to eliminate the effects of armature inertia, as shown for example in U.S. Pat. No. 3,289,471 to Maxwell. Unfortunately, such a manual testing technique is very time consuming and results in substantial heating of the electric motor being tested.

SUMMARY OF THE INVENTION

In accordance with the present invention, the disadvantages of prior automated testing systems and methods have been overcome. A motor to be tested is rigidly clamped to a fixed platform, and is externally driven to operating speed. The test motor is then energized and variable loading is used to produce linear deceleration and/or linear acceleration. Transducers coupled to the test motor, including a torque transducer associated with the shaft of the test motor, produce analog signals which are converted to corresponding digital representations stored in a digital memory. Upon completion of the testing interval, which occupies only several seconds, the stored representations are read out of the memory to produce graphs and other visual displays of the motor performance.

One object of the present invention is provision of an improved method and apparatus for automatically testing at full operating speed an electric motor which remains cool and can be linearly decelerated and accelerated in order to measure a variety of motor parameters.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 is a partly perspective and partly block diagram of the motor testing method and apparatus;

FIG. 2 is a schematic illustration of the circuit configurations for both the test motor and the load motor of FIG. 1, which configurations are produced at different time intervals by the control switching units; and FIG. 3 is a schematic diagram of the controlled decelerator/accelerator shown in block form in FIG. 1.

DESCRIPTION OF THE PREFERRED EMBODIMENT

Turning to FIG. 1, an electric motor 20 which is to be tested has its motor housing 22 rigidly constrained by a strap 24 to stationary platform 26 which is fixed with respect to earth. The strap 24 is detachable, to facilitate replacement with another test motor, by removal of a wing nut 28 threaded on a screw 30 which is fixedly secured to strap 24 and extends through an aperture in the stationary platform 26. The shaft 32 of the test motor 20 is fixedly secured in a coupling 34 which fixedly connects with a transducer shaft 36. The transducer shaft 36 extends through an opening in a stationary wall 38, which wall is fixed with respect to earth, and into a coupling 40 which in turn is fixedly coupled to the shaft 42 of a load motor 44. The load motor has a motor housing which is rigidly fixed to earth by any suitable constraining means such as by blocks 46.

Torque is measured by a noncontacting rotating torque transducer 50 which includes the transducer shaft 36. By way of example, torque transducer 50 may be a conventional shaft sensing torque transducer formed by mounting strain gauges to the transducer shaft 36 and having outputs which modulate a transformer winding carried by the shaft 36. The resulting output signal is detected by transformer windings fixedly associated with a housing 52 which is fixedly secured to the stationary wall 38. The signal detected by the fixed windings is coupled over a line 56 for detection by a conventional torque detector 60 in order to produce on an output line 62 an analog signal representative of the torque detected by the strain gauges. Speed sensing may be accomplished by a magnetic pick-up, mounted within the torque transducer housing 52, which generates pulses coupled over an output line 64 to a speed detector 66 which counts, or integrates and filters, the pulses to produce on an output line 70 a DC voltage proportional to the RPM of the motor shaft 32.

Additional transducers and measuring circuits are provided for each motor parameter which is to be measured. A horsepower multiplier 72, in response to the torque signal on line 62 and the speed signal on line 70, multiplies the measured torque and speed by a constant to develop on an output line 74 a continuous analog signal representing the instantaneous horsepower developed by the test motor 20. A plurality of electrical measuring instruments 78 provide corresponding analog signals on a plurality of corresponding output lines 80 to indicate various electrical input characteristics. The temperature of test motor 20 is detected by a conventional copper-constantan thermocouple fastened to the motor field winding, and having an output coupled to a temperature circuit 82 for providing on an output line 84 a continuous DC signal proportional to the temperature.

During the test run, to be explained, the output signals on lines 62, 70, 74, 80 and 84 are multiplied by appropriate scale factors in signal conditioning circuit 90 and are coupled to a multiplexer 92 which samples each input line to develop a sampled analog output representation thereof. This signal is converted by an analog-to-digital (A/D) converter 94 into a corresponding retrievable digital representation which is coupled to a selected one of several storage areas 96 in a digital memory 98. A first storage area 96' may, for example, store a retrievable digital representation of the sampled speed, and the next storage area 96" may store the sampled retrievable representation of the measured torque.

The output from signal conditioning circuit 90 may also be coupled to variety of other analyzing circuits (not illustrated). For example, these signals may be coupled to peak detectors for determining the peak output produced by each transducer. The outputs of the transducers at particular time intervals, or at the peak points, may be stored by sample and hold circuitry. To continuously monitor certain related characteristics of the test motor, various comparators may be utilized. All such additional circuitry may be coupled to a control panel for instantaneous visual display of these motor characteristics. It should be understood that the system also may be modified to produce go, no-go indications for each parameter if desired.

The operation of the testing system is controlled by a sequence control unit 100 which develops a time spaced series of output control signals. In addition to controlling multiplexer 92 and digital memory 98, the sequence control unit 100 also controls a controlled decelerator/accelerator 104 and a control switching unit 106. After the measured data has been stored in memory 98 and the test interval is terminated, the sequence control 100 causes the stored signals to be coupled to a digital-to-analog (D/A) converter 110 for control of an X-Y graph 112 to visually display the stored motor parameters. In one state, sequence control unit 100 effectively couples the storage area 96" associated with torque to the Y control of the plotter 112, and the storage area 96' associated with speed to the X control of the plotter 112. The resulting graph 114 of the torque-speed curve for the test motor 20 can be displayed either as a series of closely spaced points, or as a continuous curve, as selected by controls on the plotter 112.

Digital memory 98 and sequence control 100 may be implemented by a minicomputer 102 which is programmed to provide the necessary sequence of control signals for the remaining portions of the circuit. The digital memory 98 may comprise a portion of core memory, or a portion on a cassette magnetic tape for external storage of data. Additional peripheral equipment may be controlled, including a teletype machine for providing a printed record of the stored transducer signals. A small executive program can be written to allow the user to enter on the teletype keyboard a character for each desired operation such as begin test, graph output on the X-Y plotter, list data on the teletype, etc. The use of a programmable device such as a computer 102 allows flexibility in running the test, as well as flexibility in comparing the test data output. For example, the operator may list a few points in a region of interest, and cause these points to be stored in the memory. At some future time, the stored points may be recalled and plotted by the X-Y plotter 112. Also, a statistical analysis program can used to analyze the data from several runs. While use of a computer 102 allows great flexibility in running the test, it should be understood that use of a computer is not essential as the sequence control unit 100 can be readily implemented by a hard-wired controller. Similarly, the digital memory 98 may be a stand-alone unit which is not associated with a computer.

The method of testing the electric motor 20 by use of the system of FIG. 1 will now be explained with reference to FIG. 2, which shows diagramatic illustrations of the interconnections produced by the control switching unit 106 at different points in time or steps. Thus, the illustrated connections do not all occur at the same time, but rather in time separated steps. By way of illustration, the test motor 20 may comprise a universal AC/DC motor with an armature 120 and a series field winding 122, and when used to power a vacuum cleaner, has a running speed of about 18,000 rpm. Such universal motors have the undesirable characteristic of heating up very quickly, whereas the test data should be taken from a cool motor.

After the test motor 20 is strapped securely to the stationary platform 26 and motor shaft 32 is fixedly secured within coupling 34, the sequence control 100 of FIG. 1 produces an initial control signal which causes control switching 106 to initial Step 1. As seen in FIG. 2, control switching 106 is effective during Step 1 to interconnect the test motor 20 and the load motor 44 in the manner illustrated within dashed lines 130. The test motor 20 is not energized during Step 1. The load motor 44 is energized by connection of its armature 132 and its field winding 134 in series with an AC source 136 which may be variable. The load motor 44 now drives the unenergized test motor 20 to running speed. Since no voltage is applied to the test motor 20, no heating of the armature 120 or field 122 occurs as the motor 20 is run up to speed.

Thereafter, the sequence control causes the switching control 106 to rearrange the electrical connections to motors 20 and 44, in the manner illustrated within the dashed lines 140 of FIG. 2. Test motor 20 is now energized by connecting the series armature 120 and field 122 across a conventional AC source 142. The connection is made through a conventional ampere meter 144 and watt meter 146, which have a sufficiently fast response time such as less than 25 milliseconds. A voltmeter 148 is coupled across the AC source 142 to provide an indication of the voltage to the test motor 20. At the same time that test motor 20 is energized, the load motor 44 will become a generator. The armature 132 of motor (now generator) 44 is shunted through a variable resistor 150, and the field winding 134 is connected to a variable DC source 152. Control over the value of the DC voltage from source 152 controls the amount of braking or load which is placed on the test motor 20.

The variable DC source 152 is formed by the controlled decelerator/accelerator 104 illustrated in block form in FIG. 1 and in detail in FIG. 3. Briefly, a controlled linear deceleration of the test motor 20 is produced during Step 2 by a generally linear loading produced by the generator 44. Upon completion of such controlled deceleration, the sequence control switches to Step 3, at which time variable DC source 152 produces controlled acceleration by a generally linear reduction in the loading produced by generator 44. Sequence control 100 then initiates Step 4, which decelerates the test motor 20 to zero speed in order to allow the test motor to be removed from the test stand. Step 4 may be implemented by the control switching unit 106 open circuiting the test motor 20 and applying a preselected DC current to the field winding 143. Or, other conventional means of decelerating the test motor to zero speed may be employed.

Turning to FIG. 3, a representative circuit is illustrated for controlled decelerator/accelerator 104 and the variable DC source 152. A battery or other fixed DC source 200 is coupled between a reference ground 202 and one terminal of a switch 204. The opposite terminal of switch 204 is coupled to a resistor 206, and to a capacitor 208 which can be shunted by closure of a switch 210. Either resistor 206 or capacitor 208 and switch 210 are selected by the wiper of a two position switch 212. The wiper is coupled through a resistor 214 to the (−) input of an operational amplifier 216 which has a feedback resistor 218 between the output thereof and the (−) input. Switch 212 is ganged to the wiper of another two position switch 222, which switch couples between resistor 214 and ground 202 either a resistor 224, or a capacitor 226 which can be shunted by a switch 227. The (+) input of operational amplifier 216 is coupled to a voltage divider consisting of a resistor 230 and a resistor 232 in series between ground 202 and output line 70 from speed circuit 66 of FIG. 1.

The variable DC source 152 includes a transistor 240 having its base coupled through a resistor 242 to the output of operational amplifier 216. The collector of transistor 240 is coupled to a junction between field winding 134 and the collector of a power transistor 244. The impedance of transistor 244 controls the amount of direct current flowing from a DC source 246, such as +20 volts DC, and through field winding 134 to ground 202. A diode 250 shunts field winding 134. The emitter of transistor 240 is directly coupled to the base of a transistor 260 having its collector directly coupled to the base of transistor 244. Resistors 264 and 266 shunt the emitters of transistors 240 and 260, respectively, to ground 202.

In operation, sequence control 100 determines whether the ganged switches 212, and 222 are in the illustrated position or in the alternate position. During step 2, the ganged switches are in the illustrated position, causing circuit 104 to control deceleration in generally, a linear manner. The test motor 20 will already have been accelerated during Step 1 to running speed, and hence the DC speed signal on line 70 is at a maximum value. After switching the circuit connection to the form 140 shown in FIG. 2, the sequence control then causes switch 204 of FIG. 3 to be closed. The initial surge of direct current is passed through capacitor 208, and almost the entire voltage drop occurs across resistor 224. This voltage drop is selected to be approximately equal to the DC signal on line 70.

As capacitor 208 charges, the voltage drop across resistor 224 decreases in an exponential manner, and hence is approximately linear during the initial charging of the capacitor 208. The operational amplifier 216 produces an output proportional to the difference between the deceleration control signal across resistor 224 and the DC speed signal on line 70. This difference output forward biases transistor 244 a sufficient amount to produce a direct current through field winding 134 having a magnitude proportional to the difference detected by operational amplifier 216. The DC signal brakes the generator and hence decelerates the test motor, causing the speed signal to decrease and hence to follow the decreasing deceleration control signal produced across resistor 224. After the test motor has decelerated by a desired amount, switch 204 is opened, and switch 210 is closed to dissipate the charge across capacitor 208. This completes step 2 of the sequence control.

In initiating Step 3, the sequence control now changes the ganged switches 212 and 222 in order to produce controlled acceleration of the test motor. The DC speed signal on line 70 is now at a value lower than before deceleration. The sequence control closes switch 204, causing capacitor 226 to charge. The time constant and the values of the components are selected so that substantially no potential difference appears across the inputs of operational amplifier 216 at this time. If necessary, a DC offset voltage may be inserted so that operational amplifier 216 has no output. As capacitor 226 charges, the voltage through resistor 216 rises and produces a lesser amount of conduction in transistor 244, reducing the DC field for the generator. This decreases the loading and allows the test motor to speed up, thereby causing the DC speed signal on line 70 to follow the charge rate of the capacitor, which is approximately linear during initial charging. After accelerating to a desired speed, switch 204 is opened and switch 227 is closed to discharge the capacitor 226.

Similar to the string and pulley method of testing torque, the torque measured by unit 50 of FIG. 1 is composed of the actual torque delivered to a load at steady state, plus or minus a factor related to armature inertia. By averaging the measured torque produced during constant acceleration and constant deceleration, the actual torque at steady state is derived since the effects of armature inertia cancel from the equation. Such averaging can automatically be computed by the computer 102.

Various modifications can be made to the above circuits, following the above teachings. For some motors being tested, especially universal motors, even the short time interval necessary for controlled deceleration and acceleration may be sufficiently long to produce undesirable motor heating. In such an event, the test could be run with controlled deceleration or acceleration, followed by a cooling off period, after which the test would be repeated with controlled acceleration or deceleration, respectively. Rather than running the test motor up to full operating speed, the control switching unit 106 could be effective when the test motor reached a predetermined speed (as indicated by speed unit 66) for energizing the test motor and continuing acceleration up to running speed under control of unit 104. Other motor performance tests of a conventional nature, such as a locked rotor test or a bearing test, can easily be incorporated in the system.

We claim:

1. A method of testing an electric motor having a motor shaft rotatable with respect to a motor housing, comprising the steps of:
   rigidly constraining the motor housing to a fixed position during the entire testing period,
   rotating the motor shaft by a force external to the electric motor to accelerate the motor shaft to approximately a running speed without coupling electric power to the electric motor,
   applying electric power to the electric motor after terminating the external force,
   variably loading the motor shaft while electric power is being applied to the electric motor by use of a load force external to the electric motor to change the speed in one direction from the approximately running speed,
   variably loading the motor shaft while electric power is being applied to the electric motor by use of the load force external to the electric motor to change the speed in an opposite direction to return to the approximately running speed, and
   measuring the torque produced by the rotating motor shaft while electric power is being applied and the motor housing is being rigidly constrained and the motor shaft is being variably loaded.

2. The method of claim 1 wherein the steps of variably loading the motor shaft includes applying controlled restraining forces to produce an approximately linear rate of change of speed.

3. A method of testing an electric motor having a motor shaft rotatable with respect to a motor housing, comprising the steps of:
   rigidly constraining the motor housing to a fixed position during the entire testing period,
   rotating the motor shaft by a force external to the electric motor to accelerate the motor shaft without coupling electric power to the electric motor,
   applying electric power to the electric motor after terminating the external force,
   measuring the torque produced by the rotating motor shaft while electric power is being applied and the motor housing is being rigidly constrained to generate analog signals representing the torque produced by the rotating motor shaft,
   storing representations of the analog signals to allow the entire testing period to be sufficiently short to preclude substantial heating of the electric motor, and
   reading out the stored representations over a longer time period than the testing period.

4. A system for rapidly testing an electric motor to determine the running characteristics thereof before the electric motor heats to an undesirable extent, comprising:
   a load motor coupled to the electric motor,
   acceleration means for energizing the load motor to cause the electric motor to accelerate to a running speed without energizing the electric motor,
   transducer means for generating analog signals which continuously represent motor parameters being tested,
   memory means for storing retrievable representations of the analog signals,
   sequence control means for energizing the electric motor over a testing interval and for storing the retrievable representations of the analog signals in the memory means during the testing interval, and
   read-out means operative over a longer time period than the testing interval for displaying the retrieved representations of the analog signals.

5. The system of claim 4 wherein said read-out means includes graph display means responsive to the retrieved representations of analog signals of two of said transducer means for producing a graph thereof.

6. The system of claim 4 including control switching means responsive after the acceleration means has accelerated the electric motor for switching electric power from the load motor to the electric motor and for controlling the load motor to produce a variable load on the electric motor, including means for producing an approximately linear rate of change of speed of the load motor and hence of the electric motor being tested.

7. The system of claim 4 including a stationary platform, restraining means for rigidly mounting the electric motor to the stationary platform, one of said transducer means comprises a torque transducer coupled to the shaft of the electric motor for generating an analog torque signal representative of the torque of the motor shaft while the electric motor is rigidly constrained to the stationary platform.

8. A system for testing an electric motor to determine the torque thereof, comprising:
   a load motor coupled to the electric motor,
   run-up means for energizing the load motor to accelerate the electric motor to a running speed,
   energization means effective after the electric motor is at running speed for applying electric power to the electric motor,
   linear means automatically controlling the load motor for producing in sequence an approximately linear rate of change of deceleration or acceleration of the electric motor and then an approximately linear rate of change of acceleration or deceleration, respectively, of the electric motor, and
   a torque transducer for measuring the torque produced by the electric motor while controlled by the linear means, whereby the average of the measured torque during acceleration and deceleration represents the actual torque of the electric motor eliminating the effects of armature inertia.

9. The system of claim 8 including memory means for storing representation of the measured torque from the torque transducer, and read-out means coupled to the memory means for producing a display of the measured torque from the representations stored in the memory means.

10. The system of claim 8 wherein said electric motor has a motor shaft rotatable with respect to a motor housing, a rigid platform, restraining means for fixedly mounting the motor housing to the stationary platform, and said torque transducer is coupled to the motor shaft and between the electric motor and the load motor for measuring the torque produced by the electric motor.

* * * * *